(12) United States Patent
Popović et al.

(10) Patent No.: US 6,370,397 B1
(45) Date of Patent: Apr. 9, 2002

(54) SEARCH WINDOW DELAY TRACKING IN CODE DIVISION MULTIPLE ACCESS COMMUNICATION SYSTEMS

(75) Inventors: Branislav M. Popović, Stockholm (SE); Frank Georg, Nuremberg (SE); Matthias Schulist, Erlangen, both of (DE); Göran Klang, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/070,778

(22) Filed: May 1, 1998

(51) Int. Cl.$^7$ ................................................ H04B 1/38
(52) U.S. Cl. ...................... 455/561; 455/500; 375/251; 370/342
(58) Field of Search ...................... 455/561, 63, 67.1, 455/67.3, 501, 504, 506, 65, 132, 133; 375/200, 254, 285; 370/335, 342, 350

(56) References Cited

U.S. PATENT DOCUMENTS

| | | | | |
|---|---|---|---|---|
| 5,081,651 A | * | 1/1992 | Kubo ............................ | 375/341 |
| 5,263,026 A | * | 11/1993 | Parr et al. .................... | 370/95.1 |
| 5,267,261 A | | 11/1993 | Blakeney, II et al. | |
| 5,406,593 A | | 4/1995 | Chennakeshu et al. | |
| 5,414,734 A | * | 5/1995 | Marchetto et al. ........... | 375/267 |
| 5,490,165 A | | 2/1996 | Blakeney, II et al. | |
| 5,533,063 A | * | 7/1996 | Mitra et al. .................. | 375/340 |
| 5,602,832 A | * | 2/1997 | Hudson ......................... | 370/342 |
| 5,654,979 A | | 8/1997 | Levin et al. | |
| 5,673,294 A | * | 9/1997 | Namekata .................... | 375/341 |
| 5,752,161 A | * | 5/1998 | Jantti et al. .................. | 455/561 |
| 5,818,866 A | * | 10/1998 | Wilk ............................ | 375/200 |
| 5,818,876 A | * | 10/1998 | Love ............................ | 375/341 |
| 5,892,801 A | * | 4/1999 | Schneider .................... | 375/348 |

(List continued on next page.)

FOREIGN PATENT DOCUMENTS

| | | | |
|---|---|---|---|
| WO | 96/10873 | 4/1996 | |
| WO | 96/19056 A | 6/1996 | |
| WO | 96/24988 A | 8/1996 | |
| WO | WO 96/24988 | * 8/1996 | ........... H04B/1/707 |
| WO | 97/02714 A | 1/1997 | |

Primary Examiner—William Trost
Assistant Examiner—Tilahun Gesesse
(74) Attorney, Agent, or Firm—Nixon & Vanderhye P.C.

(57) ABSTRACT

The present invention provides a search window delay tracking procedure for use in a multipath search processor of a CDMA radio receiver. A channel impulse responses is estimated for a received signal containing plural paths, each path having a corresponding path delay. A search window defines a delay profile that contains the plural paths of the received signal. A mean or average delay is calculated for the estimated channel impulse response (CIR), and an error is determined between the mean CIR delay and a desired delay position corresponding to the center of the CIR search window. An adjustment is made to reduce that error so that the center of the search window and the mean CIR delay are aligned. The error may be processed either linearly (in one embodiment) or non-linearly (in another embodiment) to minimize the error and to reduce an influence of noise. A non-linear filtering process includes calculating a delay spread from the mean CIR delay calculated for successive processing cycles of a window delay tracking procedure corresponding to each new input. A difference is determined between the successive delay spreads. Adjustment signal is set equal to the error signal if the difference is less than or equal to a threshold. Alternatively, the adjustment signal is set to zero if the difference is greater than the threshold. Consequently, if the delay spread in the current iteration is significantly different from the delay spread in the previous iteration, the new error sample calculated in the current iteration is considered unreliable, and no adjustment is made.

41 Claims, 11 Drawing Sheets

U.S. PATENT DOCUMENTS

| | | | |
|---|---|---|---|
| 6,121,927 A | * 9/2000 | Kallojarvi | 342/453 |
| 6,144,861 A | * 11/2000 | Sundelin et al. | 455/522 |
| 6,185,251 B1 | * 2/2001 | Fertner | 375/231 |
| 6,192,238 B1 | * 2/2001 | Piirainen | 455/422 |
| 6,205,166 B1 | * 3/2001 | Maruta et al. | 375/345 |
| 6,212,406 B1 | * 4/2001 | Keskitalo et al. | 455/562 |
| 6,219,388 B1 | * 4/2001 | Tanada et al. | 375/341 |

* cited by examiner

SEARCH WINDOW DELAY TRACKING IN CODE DIVISION MULTIPLE ACCESS COMMUNICATION SYSTEMS

FIELD OF THE INVENTION

The present invention relates to code division multiple access (CDMA) communication in cellular radio telephone communication systems, and more particularly, to a multipath search processor employed in a CDMA RAKE type receiver.

BACKGROUND AND SUMMARY OF THE INVENTION

Direct sequence code division multiple access (DS-CDMA) allows signals to overlap in both time and frequency so that CDMA signals from multiple users simultaneously operate in the same frequency band or spectrum. In principle, a source information digital data stream to be transmitted is impressed upon a much higher rate data stream generated by a pseudo-random noise (PN) code generator. This combining of a higher bit rate code signal with a lower bit rate data information stream "spreads" the bandwidth of the information data stream. Accordingly, each information data stream is allocated a unique PN or spreading code (or a PN code having a unique offset in time) to produce a signal that can be separately received at a receiving station. From a received composite signal of multiple, differently coded signals, a specifically PN coded information signal is isolated and demodulated by correlating the composite signal with the specific PN spreading code associated with that specific information signal. This inverse de-spreading operation compresses the received signal to permit recovery of the original data signal and at the same time suppresses interference from other users.

In addition to receiving signals transmitted from several different transmitting information sources, a receiver may also receive multiple, distinct propagation paths of the same signal transmitted from a single transmitter source. One characteristic of such a multipath channel is an introduced time spread. For example, if an ideal pulse is transmitted over a multipath channel, the received corresponding signal appears as a stream of pulses, each pulse or path having a corresponding different time delay, as well as different amplitude and phase. Such a complex received signal is usually called the channel impulse response (CIR). Multipaths are created in a mobile radio channel by reflection of the signal from obstacles in the environment such as buildings, trees, cars, people, etc. Moreover, the mobile radio channel is dynamic in the sense it is time varying because of relative motion affecting structures that create the multipaths. For a signal transmitted over a time varying multipath channel, the received corresponding multiple paths vary in time, location, attenuation, and phase.

The existence of multiple paths, however, may be used to advantage in a CDMA system using signal diversity combining techniques. On advantage concerns signal fading which is a particular problem in mobile communications. Although each multipath signal may experience a fade, all of the multipaths usually do not fade simultaneously. Therefore, a diversity-combined signal output from a CDMA receiver is not adversely affected by a temporary fade of one multipath.

A CDMA receiver in accordance with the present invention employs a multipath search processor that searches for and identifies the strongest multipaths along with their corresponding time delays. A RAKE demodulator captures most of the received signal energy by allocating a number of parallel demodulators (called RAKE "fingers") to the strongest multipath components of the received multipath signal as determined by the multipath search processor. The outputs of each of the RAKE fingers are diversity-combined after corresponding delay compensation to generate a "best" demodulated signal that considerably improves the quality and reliability of communications in a CDMA cellular radio communications system.

The multipath search processor, (sometimes referred to herein as simply "searcher") used in accordance with an example embodiment of the present invention identifies the channel impulse response of a complex received signal in order to extract the relative delays of various multipath components. The searcher also tracks changing propagation conditions resulting from movement of the mobile station or some other object associated with one of the multipaths to adjust the extracted delays accordingly.

More specifically, the channel impulse response of a received multipath signal is estimated within a certain range of path arrival times or path arrival delays called a search window. All signals detected within the search window form the delay profile, but only those signals originated from the transmitter belong to the channel impulse response. The remaining received signals in the delay profile are noise and interference. When the signals forming the delay profile are represented by their respective powers and delays, the delay profile is called power delay profile (PDP).

The channel impulse response is estimated very frequently so that delay variations, of the radio channel can be tracked. In particular, the position of the channel impulse response within the search window frequently changes because of movement of the mobile station or other object motion as well as from frequency mismatch of the PN sequence generators used at the transmitter for spreading and at the receiver for de-spreading. As a result, the position of the search window must be adjusted to keep the channel impulse response in the middle of the search window.

Thus, it is an object of the present invention to adapt the search window position in order to maintain accurate alignment between the estimated channel impulse response and the search window.

It is also an object of the present invention to provide a methodology for accurately and efficiently determining the center of the channel impulse response so that adjustment of the search window is made to an accurate center position.

It is a further object of the present invention to adapt each selected multipath delay in accordance with the search window adjustments.

It is also an object of the present invention to provide a methodology for efficient filtration of a search window delay adjustment signal in order to minimize the influence of noise and interference.

The present invention provides a search window delay tracking procedure for use in a multipath search processor of a CDMA radio receiver. A channel impulse response is estimated for a received signal containing plural paths, each path having a corresponding path delay. A search window defines a delay profile that contains (1) the plural multipath components of the received signal forming the channel impulse response (CIR) and (2) noise and interference signals at delays where the transmitted multipath components do not exist. A mean or average delay is calculated for the estimated channel impulse response, and an error is determined between the mean CIR delay and a desired delay position corresponding to the center of the CIR search window. An adjustment is made to reduce that error so that the center of the search window and the mean CIR delay are aligned. The error may be processed either linearly (in one embodiment) or non-linearly (in another embodiment) to minimize the error and to reduce an influence of noise.

A non-linear filtering process includes calculating a delay spread from the mean CIR delay calculated for successive iterations, each iteration corresponding to a processing cycle of the window delay tracking procedure corresponding to each new input. A difference is determined between the successive delay spreads. A search window adjustment signal is set equal to the error signal if the difference is less than or equal to a threshold. Alternatively, the adjustment signal is set to zero if the difference is greater than the threshold. Consequently, if the delay spread in the current iteration is significantly different from the delay spread in the previous iteration, the new error sample calculated in the current iteration is considered unreliable, and no adjustment is made.

In a preferred example embodiment, the present invention is applied to a radio base station that includes plural sectors, each one of the sectors having one or more directive antennas receiving a signal from a mobile station that contains multiple paths. Each path has a corresponding delay. A multipath search processor at the base station includes plural channel estimators, one corresponding to each of the plural sectors. Each channel estimator generates a delay profile within a search window containing the actual channel impulse response as well as noise and interference. A path selector in the multipath search processor selects paths with strongest signals from the delay profiles generated by each channel estimator and outputs a selected channel impulse response made up of the corresponding delay and power for each selected path. A window tracking unit maintains alignment of a center of the selected channel impulse response and a center of the search window. A demodulator demodulates the selected paths and combines the demodulated paths into a combined received signal. The window tracking unit adjusts the search windows in all channel estimators to maintain the center alignment as well as adapts the delays for the selected paths according to any search window adjustment.

The window tracking unit in particular calculates a mean delay from the selected paths, determines an error between the mean delay and the center of the search window, and adjusts the position of each search window in order to reduce the error. A window tracking unit controller calculates a delay spread for each new selected channel impulse response, determines a difference between the successive delay spreads, and sets an adjustment signal proportional to the error signal if the difference is less than or equal to a threshold, or sets the adjustment signal equal to zero if the difference is greater than the threshold.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, circuits, signal formats, techniques, etc. in order to provide a thorough understanding of the present invention. However, it will be apparent to one skilled in the art that the present invention may be practiced in other embodiments that depart from these specific details. For example, while the present invention is described in the context of a base station receiver, the present invention may be applied to any receiver, e.g., in a mobile station. In other instances, detailed descriptions of well-known methods, devices, and circuits are omitted so as not to obscure the description of the present invention with unnecessary detail.

Figure 1:
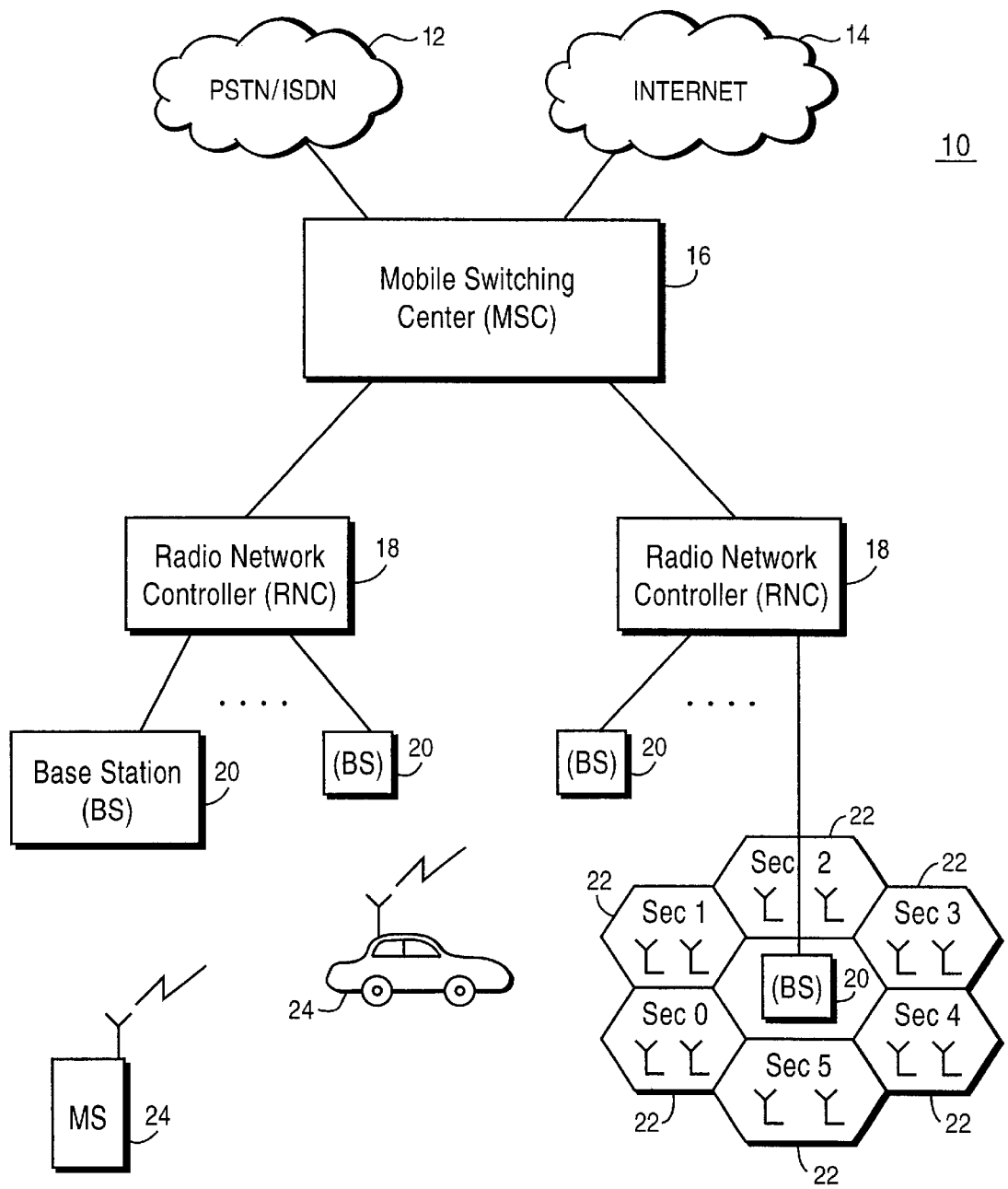
FIG. 1 is a function block diagram of a cellular radio communications system in which the present invention may be employed.

The present invention is described in the context of a CDMA (preferably wideband CDMA) cellular radio telecommunications system 10 as shown in FIG. 1. A representative, connection-oriented external core network shown as cloud 12, may be for example the Public Switched Telephone Network (PSTN) and/or the Integrated Services Digital Network (ISDN). A representative, connectionless-oriented, external core network shown as cloud 14, may be for example the Internet. Both core networks are coupled to one or more service nodes. For simplicity, only a single service node is shown as a mobile switching center (MSC) node 16 that provides switching services. The mobile switching center 16 is connected to a plurality of radio network controllers (RNCs) 18. Each radio network controller 18 establishes and releases a particular channel between one or more base stations (BSs) 20 and mobile station (MS) 24 including the selection and allocation of spreading codes and diversity handovers. The base station 20 handles the wideband CDMA radio interface to mobile station 24 and includes radio equipment such as transceivers, digital signal processors, and antennas required to serve each cell and cell sector in the network. As shown for one base station 20, each base station may include multiple sectors 22, and each sector preferably includes two diversity antennas.

Figure 2:
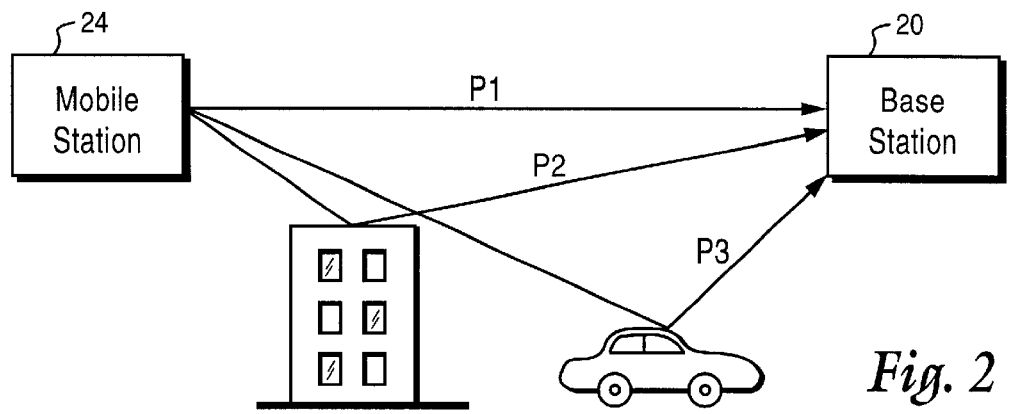
FIG. 2 is a drawing illustrating multipath propagation between a mobile station and a base station.
Figure 4:
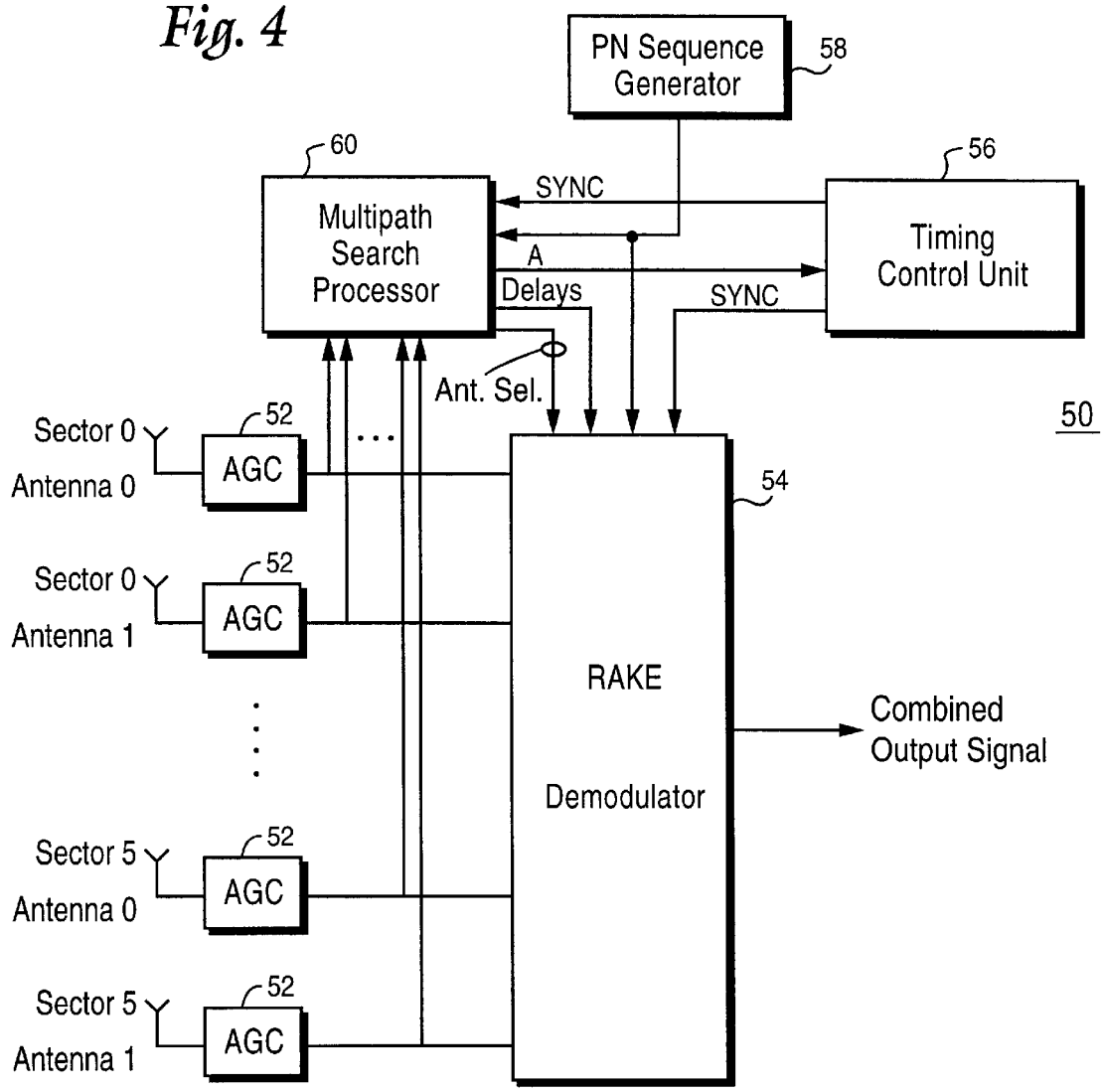
FIG. 4 illustrates an example embodiment of a CDMA receiver in which the present invention may be employed.

FIG. 2 illustrates a simplified, dynamic multipath propagation model. While multipath propagation must be addressed by both mobile stations and base stations, for description purposes only, the multipath example illustrates a signal being transmitted from a mobile station 24 to a base station 20. The transmitted signal is received at the base station 20 the by the diversity antennas in plural sectors 22 with each received signal having multiple paths P1, P2, and P3. Path 1 is the direct, first received, and often the strongest path. Path 2 is reflected off a stationary object such as a building. Path 3 is reflected off a moving object such as an automobile. The mobile station 24 may be also be moving. The basic problem then for the receiver in the base station 20 is to identify each of these paths P1–P3 to determine their magnitude and relative delay so the three paths may be diversity-combined taking into account their respective delays.

Figure 3:
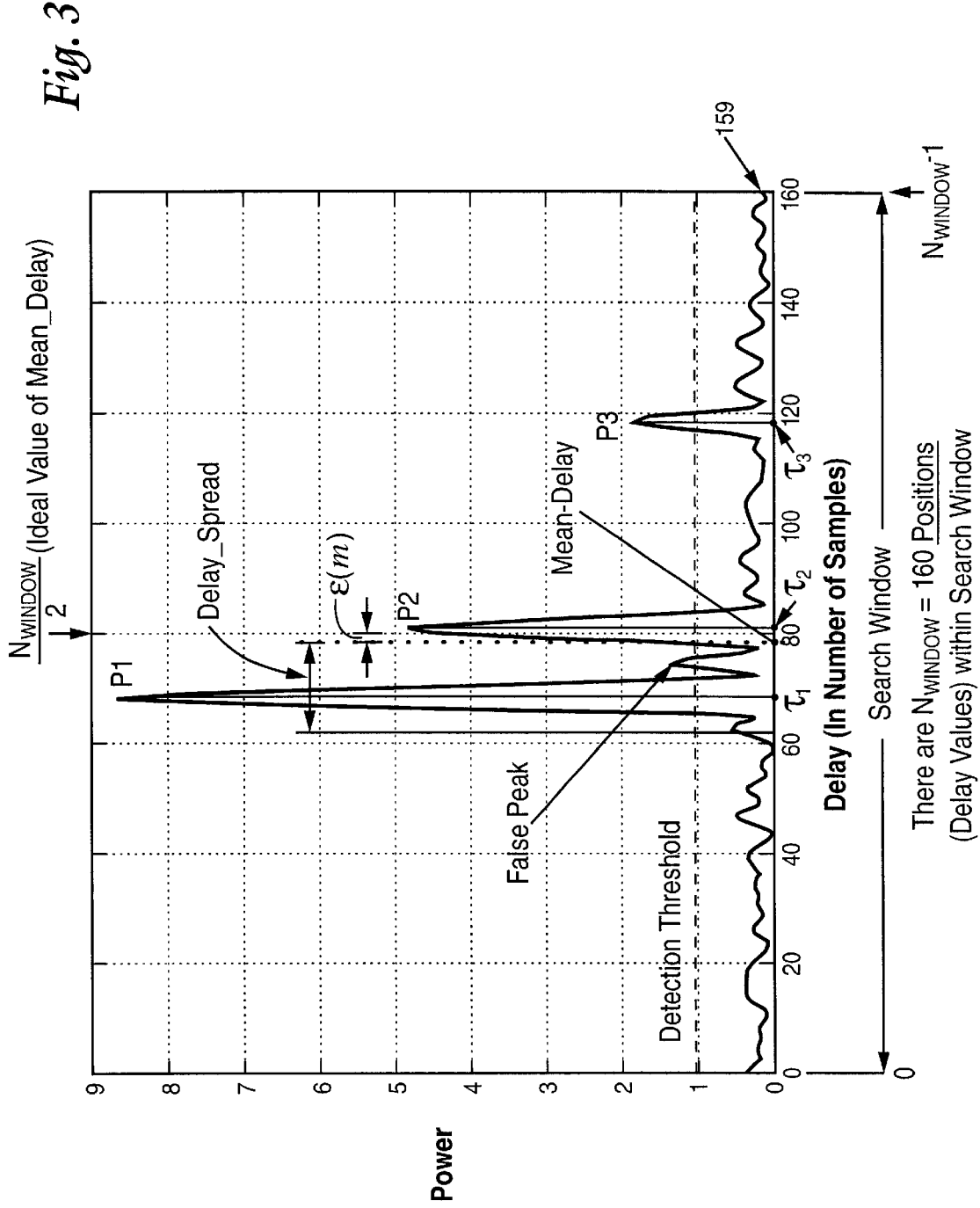
FIG. 3 is a graph showing an example multipath channel impulse response delay profile useful in illustrating principles of the present invention.

FIG. 3 illustrates a graph employed to help explain the principles of the present invention. The vertical axis of the graph is received signal power. The horizontal axis is delay time intervals related to the rate at which the received signal is sampled. The waveform is the estimated channel impulse response and includes four peaks having a magnitude that exceed a detection threshold. Only the three peaks corresponding to paths P1, P2, and P3 are valid multipaths. The fourth peak is a false peak, but because it exceeds the threshold, it is also identified as the path. Path 1 corresponds to delay $\tau 1$, path 2 corresponds to delay $\tau 2$, and path 3 corresponds to delay $\tau 3$.

The width of the horizontal axis corresponds to a search window. The length of the search window is sufficient to fully encompass the channel impulse response (all of the significant multipaths of the received signal) plus an additional offset so that the window is somewhat wider than the portion of the channel impulse response containing valid multipaths. More formally, the search window is defined by the number of delay values used as starting positions for correlating the received signal with the PN code in order to cover the maximum expected delay of the last-arrived, detected multipath component with respect to the first-arrived, detected multipath component. In this example embodiment, the number of complex samples corresponding to the maximum expected multipath delay is 160, and therefore, $N_{window}$ equals 160 delay positions.

In accordance with the present invention, the center of the search window, ($N_{window}/2=80$ delay positions) is to be preferably aligned with the center of the channel impulse response. This assures that the channel impulse response including the strongest valid multipaths are contained within the search window for processing, e.g., demodulation. Otherwise, there is a risk of missing one or more multipath components.

Simply choosing the strongest or the first-arrived path as an alignment point for the search window does not yield particularly accurate results, because either one of these alignment points fluctuates according to fading or noise, and consequently, the search window is not centered around the channel impulse response. Instead, in the present invention, the center of the search window is aligned with a mean or average delay value of the channel impulse response. The mean delay is determined by averaging the delays of each of the multipaths of the channel impulse response. The difference or error $\epsilon$ between the center of the search window $N_{window}/2$ (at delay position 80 in FIG. 3) and the mean delay location (at a delay position slightly less than 80) is detected and minimized by adjusting the location of the search window (or by making some other adjustment).

With the multipath illustration of FIG. 2 and the graph in FIG. 3 in mind, (including the parameters defined in FIG. 3), reference is now made to a base station receiver 50. Again, while the preferred example embodiments are described with the present invention employed in the base station 20, those skilled in the art will appreciate that the present invention may be employed in any receiver including a receiver in the mobile station.

Receiver 50 includes a RAKE demodulator 54 having a plurality of RAKE finger demodulators (not shown) which receive inputs from a PN sequence generator 58 (i.e., a PN de-spreading code sequence) and from a timing control unit 56. The timing control unit 56 generates synchronization (SYNC) signals provided to the RAKE demodulator 54 and to a multipath search processor 60 also connected to the RAKE demodulator 54. Signals from two diversity antennas 0 and 1 for each six base station sectors (0–5) are input to respective automatic gain control (AGC) circuits 52. Each AGC circuit is connected to both diversity antenna signals to reduce the long term dynamic range of the received signal, thereby reducing the required number of bits for signal representation but at the same time preserving the information content of the signal. Analog-to-digital conversion can be performed before or after AGC and therefore is not explicitly shown in the figure. The multipath search processor 60 calculates delay profiles for each of the sectors using those output samples as described in further detail below. The signal samples are also provided to the RAKE demodulator 54 for de-spreading and combining. The combined output signal is generated using a number of antenna signals from different sectors selected by the multipath search processor according to the strongest multipaths received by all of the base station sectors.

While the present invention is directed specifically to the multipath search processor 60, a brief, general understanding of how the base station receiver processes received signals is helpful in understanding the present invention. Pilot symbols or other known signals transmitted from the mobile station are used by the base station to estimate the channel impulse response. The base station needs to derive synchronization signals necessary to extract periodically inserted pilot symbols from the received signal samples. Such initial synchronization may be obtained after a random access procedure employed by mobile radios over a known access channel used to acquire a traffic channel from the base station. After successful completion of the random access procedure, the base station is synchronized to the first-arrived, detected multipath signal component originated from the mobile station. That initially received synchronization signal is used to extract pilot symbols subsequently transmitted on the traffic channel. Further adjustment of the synchronization signal is the task of window delay tracking unit in the searcher.

Figure 5:
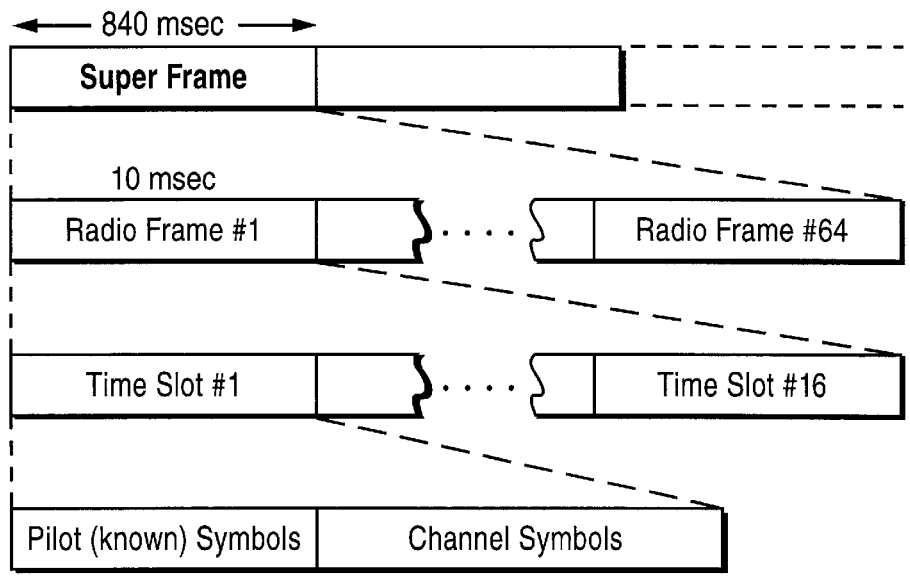
FIG. 5 illustrates a format of an example information signal as transmitted processed and demodulated by the receiver in FIG. 4.

In order to understand the role and use of pilot symbols, reference is now made to FIG. 5 which shows an example data format in which information is transmitted from the mobile station. Information symbols are formatted at the highest level as consecutive superframes provided to appropriate spreading circuitry in the mobile station transmitter. The superframe information is spread using a PN code assigned by the base station to the mobile station and transmitted over the radio interface. Each superframe (which may be for example 840 milliseconds), may include for example 64 consecutive radio frames where each radio frame may be 10 milliseconds. Similarly, each 10 millisecond radio frame may include 16 time slots, and each time slot includes pilot or known symbols used for synchronization and channel symbols containing unknown information symbols to be demodulated and communicated to the base station.

Figure 6:
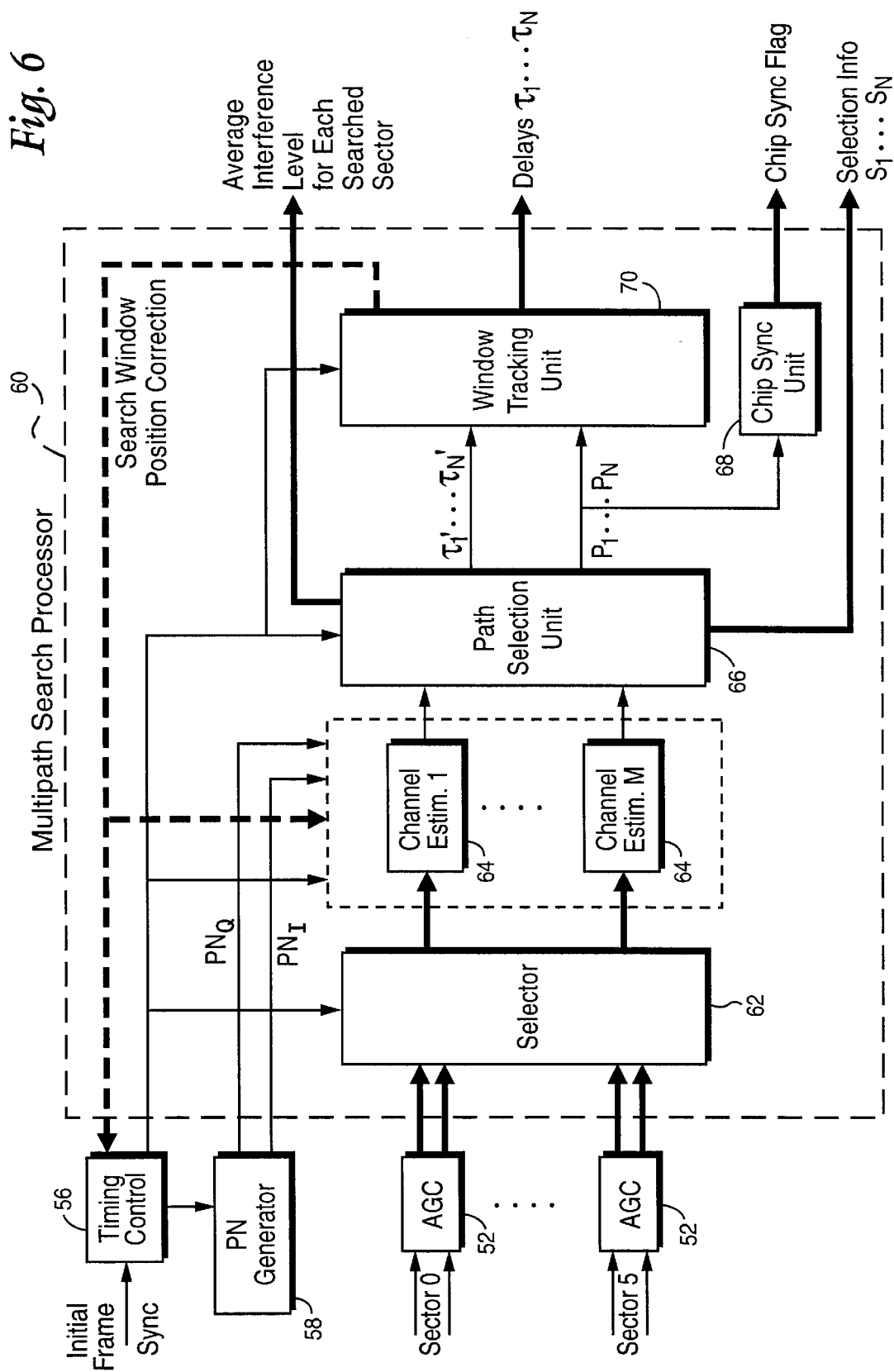
FIG. 6 is a function block diagram of the multipath search processor shown in FIG. 4 in which the present invention may be advantageously employed.

Assuming that initial synchronization is acquired, reference is now made to the multipath search processor 60 illustrated in additional detail in FIG. 6. The signal received by each automatic gain control unit corresponds to the signal transmitted by the mobile station. Each of the automatic gain control circuits 52 is connected to base station selector 62 which selects blocks of signal samples from both antenna signals from each base station sector. Again, while sectors and antenna diversity are employed in this example embodiment, it is understood that the present invention is not restricted to antenna diversity or to base stations with sectors.

Each base station sector has a corresponding one of M channel estimators 64, where M equals the number of base station sectors. The selector 62 extracts blocks of signal samples to be searched for known symbols, e.g., pilot symbols, and provides those blocks to their corresponding channel estimator 64. The channel estimators 64 perform code matched filtering with coherent and non-coherent integration of the code matched filter responses. In coherent integration, complex correlation values obtained in a number of successive time slots for the same delay of the block of received signal samples are added together. In non-coherent integration, the powers of coherently-integrated correlation values are summed. For each antenna, the corresponding channel estimator delivers an average power delay profile corresponding to the estimated channel impulse response to the path selection unit 66. The path selection unit 66 discriminates between signal and noise samples in the M delay profiles and then selects a number of strongest path signals to be demodulated in the RAKE demodulator 54.

The corresponding path delays and powers of the N paths selected by the path selection unit 66 are provided to a window tracking unit 70. The number N of selected paths should be equal to the number of RAKE fingers, but N can also be smaller if there are not enough paths with powers above the detection threshold. These selected paths form a selected channel impulse response as defined above. The main function of the window tracking unit 70 is to keep the multipath channel impulse response in the middle of the search window. The search window position is corrected using a search window position correction signal from the window tracking unit 70 provided to the timing control block 56. By adjusting the phase, i.e., the state of the PN generators which is applied to the channel estimator 64, the search window is effectively adjusted. Another function of the window tracking unit 70 is to adapt the selected path delays $\tau_1', \ldots, \tau_N'$ in accordance with the search window adjustments. A chip synchronization unit 68 determines whether an initial synchronization process is completed, and if so, sets a chip sync flag. The chip synchronization unit 68 detects that chip synchronization has been achieved if there is at least one selected path, with arbitrary power $P_k$, that exceeds a detection threshold in the path selection unit 66.

Figure 7:
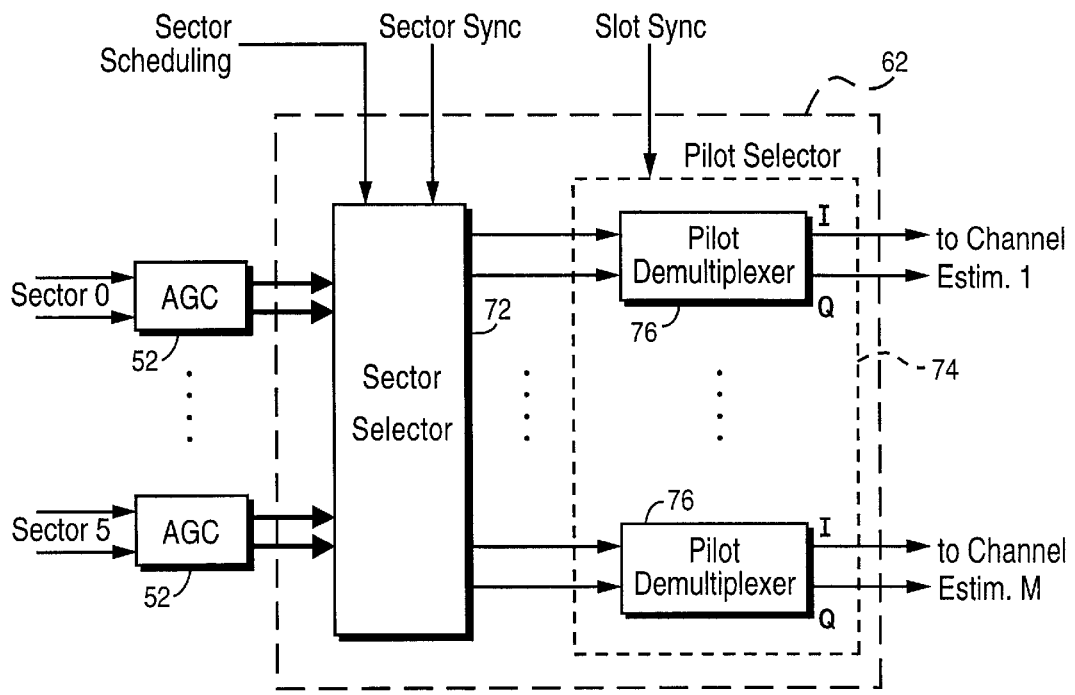
FIG. 7 is a function block diagram of a selector from the multipath search processor shown in FIG. 6.

The selector 62 is comprised of a sector selector 72 and a pilot selector 74 as shown in FIG. 7. The sector selector 72 selects which of the base station sectors is to be searched. For each selected base station sector, both sector antennas are searched concurrently. Thus, it may be advantageous to reduce hardware complexity by having only M=2 channel estimators 64, and only one base station sector is searched at a time. As a result, the sector selector time multiplexes outputs of the different sector antennas. The pilot selector 74 consists of M pilot demultiplexers 76 providing selected outputs to respective M channel estimators 64.

Each pilot demultiplexer 76 extracts and buffers $L_{buffer}$ complex samples. Assuming a chip oversampling rate of four (i.e., four samples per chip) in the receiver, the length of the buffer in each pilot demultiplexer is provided by the following equation:

$$L_{buffer} = N_{pilot\ symbol} * \text{spreading factor} * \text{oversampling factor} + N_{window} - 1 \qquad (1)$$

where $N_{pilot\ symbol}$ is the number of known pilot symbols in each time slot, and the spreading factor corresponds to the number of chips per symbol. As illustrated in FIG. 3, an example search window $N_{window}$ equals 160 complex samples (delay time intervals) which corresponds to a maximum expected delay of the multipath channel impulse response. Because the exact channel impulse response position is uncertain, an additional $N_{window} - 1$ samples are stored along with the number of samples corresponding to the known pilot symbols.

Figure 8:
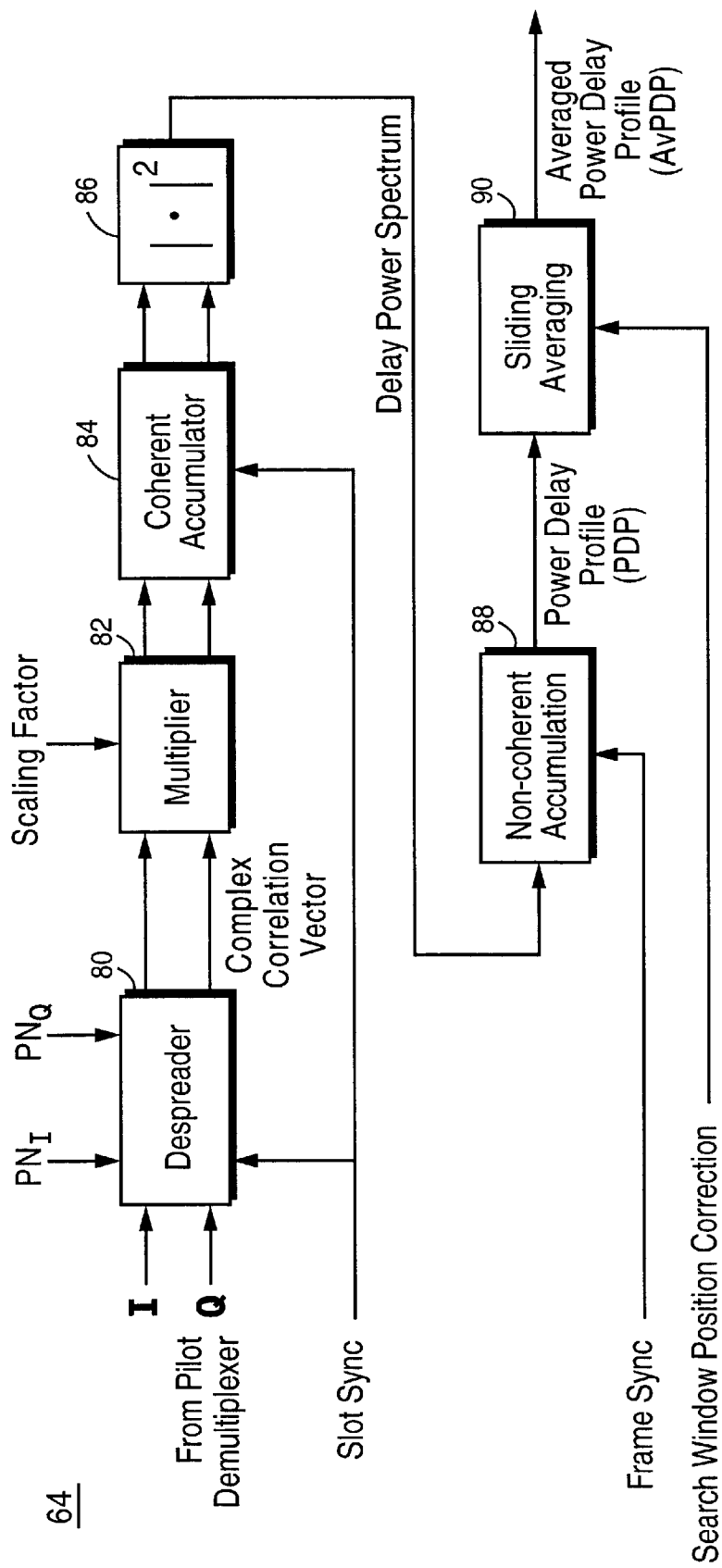
FIG. 8 is a function block diagram of one of the channel estimators of the multipath search processor shown in FIG. 6.
Figure 9:
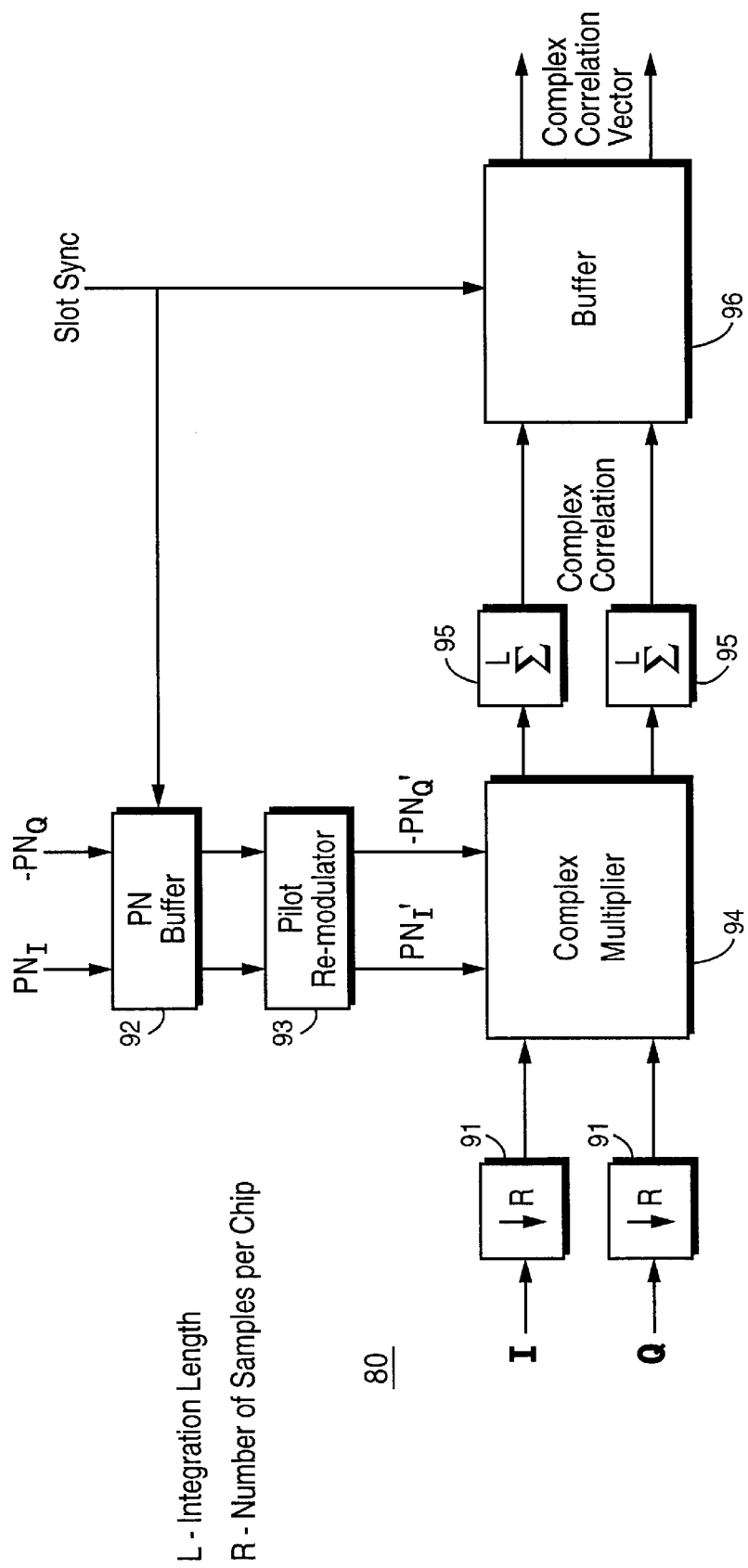
FIG. 9 is a function block diagram of the de-spreader in the channel estimator shown in FIG. 8.

The structure of each of the M parallel channel estimators 64 is shown in FIG. 8. The demultiplexed and buffered signal from corresponding pilot demultiplexer buffer 76 is correlated in a de-spreader 80 with the known, complex $PN_1/PN_Q$ de-spreading code (the pilot sequence) to generate a complex correlation vector thereafter multiplied by a scaling factor in multiplier 82 which depends on the automatic gain control amount. FIG. 9 shows in more detail the de-spreader 80. The input complex signal is down-sampled (decimated) by a factor R=4 in parallel I/Q decimators 91 to obtain one sample per chip. The down-sampled signal is multiplied chip-by-chip in the complex multiplier 94 with a segment of the complex conjugated and re-modulated spreading sequence provided form PN buffer and pilot re-modulator 93. The complex multiplication results are integrated in parallel I/Q integrators 95 over L chips to produce a complex correlation value. The re-modulation of the spreading sequence is performed in order to remove the influence of the pilot symbol pattern (i.e., its information content) on the correlation value.

The same complex PN sequence, (i.e., including both real $PN_1$ and imaginary $PN_Q$ sequences), is correlated using complex despreader 80 with successive sample offsets of the received signal stored in a corresponding pilot demultiplexer 76 buffer. The correlation procedure is repeated $N_{window} = 160$ times for a given segment of the PN de-spreading sequence to a produce 160 complex correlation values in the correlation vector. The complex correlation vectors from successive time slots are coherently integrated, (i.e., corresponding complex correlation values from successive time slots are added in phase), in a coherent accumulator 84. The absolute value of the output of the coherent integrator 84 is obtained and squared (block 86) to obtain a delay power spectrum (DPS). The delay power spectra are non-coherently integrated in a non-coherent accumulator 88 to produce a power delay profile (PDP) for each radio frame. Additional averaging of power delay profiles in sliding averager 90 is preferably performed to obtain an average PDP over a number of frames, having reduced noise/interference peaks.

In this example, two antenna diversity is implemented in each base station sector. The average power delay profiles from the two antennas in the same sector are added and stored with a corresponding delay value. The power values of the paths in the average PDPs are compared to a detection threshold, such as the horizontal dashed line shown in FIG. 3, and only those path power values that exceed the threshold are identified as valid paths. The valid paths from all search sectors are compared, and the N strongest paths among them are sorted and selected according to descending order of their powers. The delays $\tau_1', \ldots, \tau_N'$ and powers $P_1, \ldots, P_N$ of the selected paths are produced as the input signals for the window tracking unit 70. The selection information $S_1, \ldots, S_N$ indicates which base station sectors and diversity antenna signals have been selected. This selection information is used in the RAKE receiver to select appropriate input signals. In addition, the average interference power for each sector is provided as an input signal for signal-to-interference ratio (SIR) estimation used for power control. The N strongest paths are then assigned to corresponding demodulation fingers in the RAKE demodulator for demodulation and diversity combination.

Figure 10:
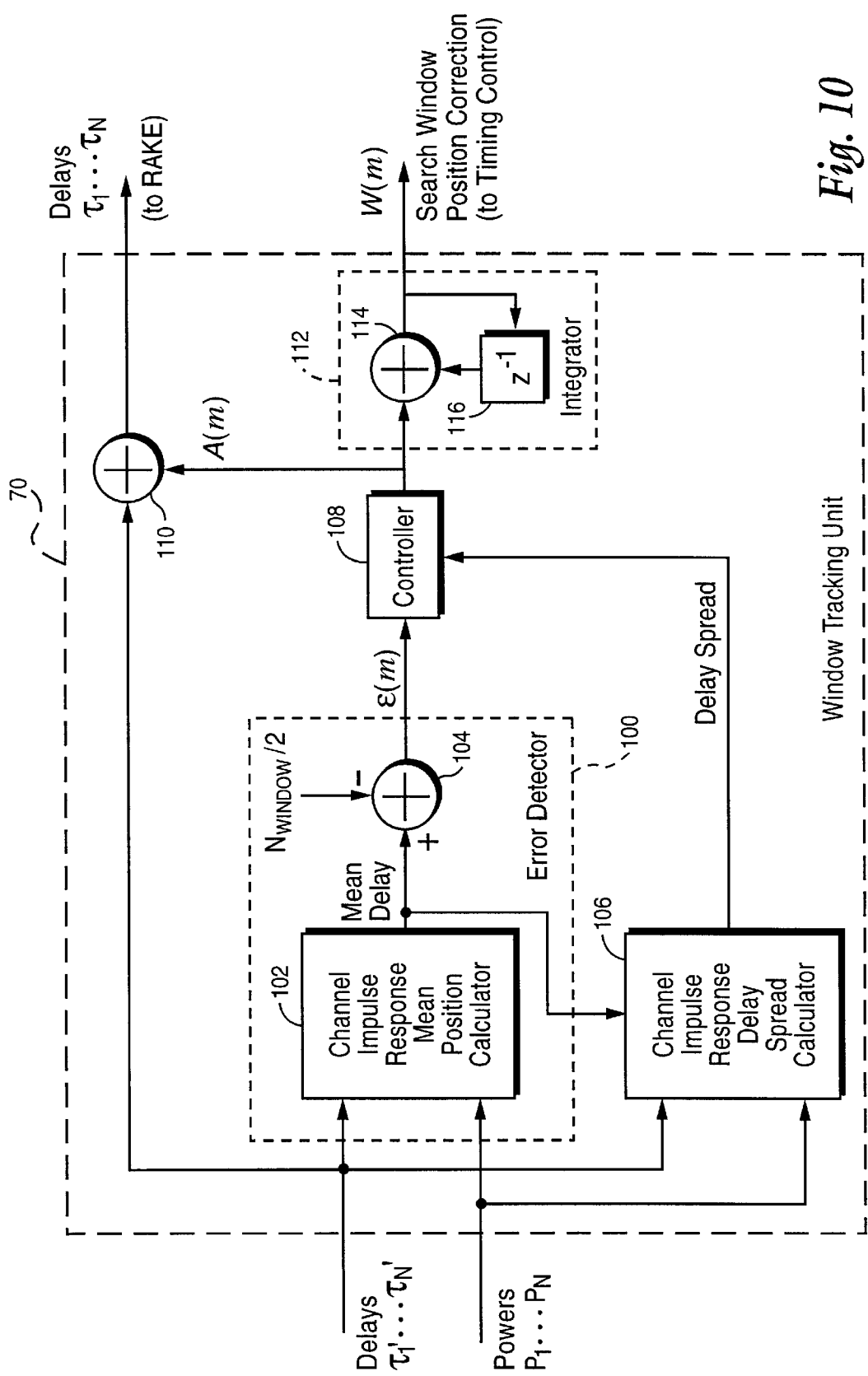
FIG. 10 is a function block diagram of a window tracking unit in accordance with one example embodiment of the present invention.

Referring now to FIG. 10, the window tracking unit 70 receives delays $\tau_1', \ldots, \tau_N'$ and powers $P_1, \ldots, P_N$ for the selected paths from the path selection unit 66. The window tracking unit 70 includes an error detector 100 which comprises a channel impulse response (CIR) mean position calculator 102 connected to a summer 104 which also receives as an input at a subtraction terminal the center location of the search window $N_{window}/2$ measured in delay intervals. The output of the summer 104 corresponds to an error signal $\epsilon(m)$ in a processing cycle m being analyzed by controller 108. The mean delay value output by channel impulse response mean position calculator 102 is provided as an input to a channel impulse response delay spread calculator 106 along with the corresponding delays $\tau_1', \ldots, \tau_N'$ and powers $P_1, \ldots, P_N$ of the selected paths. Examples of the search window, mean delay, delay spread, paths $P_1-P_3$, and delays $\tau_1-\tau_3$ are labeled in FIG. 3.

Controller 108 processes the error $\epsilon(m)$ along with delay spread provided by the CIR delay spread calculator 106 to generate an adjustment signal A(m) provided both to a summer 110 and to an integrator 112. The adjustment signal A(m) is used to adjust the selected path delays $\tau_1', \ldots, \tau_N'$ which are provided to the RAKE demodulator so that appropriate delays can be applied to the RAKE finger outputs for coherent addition to generate the combined output signal. Integrator 112 includes a summer 114 and a delay 116 for accumulating the outputs of the controller 108 and outputting a search window position correction signal W(m) provided to the timing and control unit 56. The timing control unit 56 controls the phase of the PN sequence generator 58 so that it is delayed or advanced according to the value of W(m).

Figure 11:
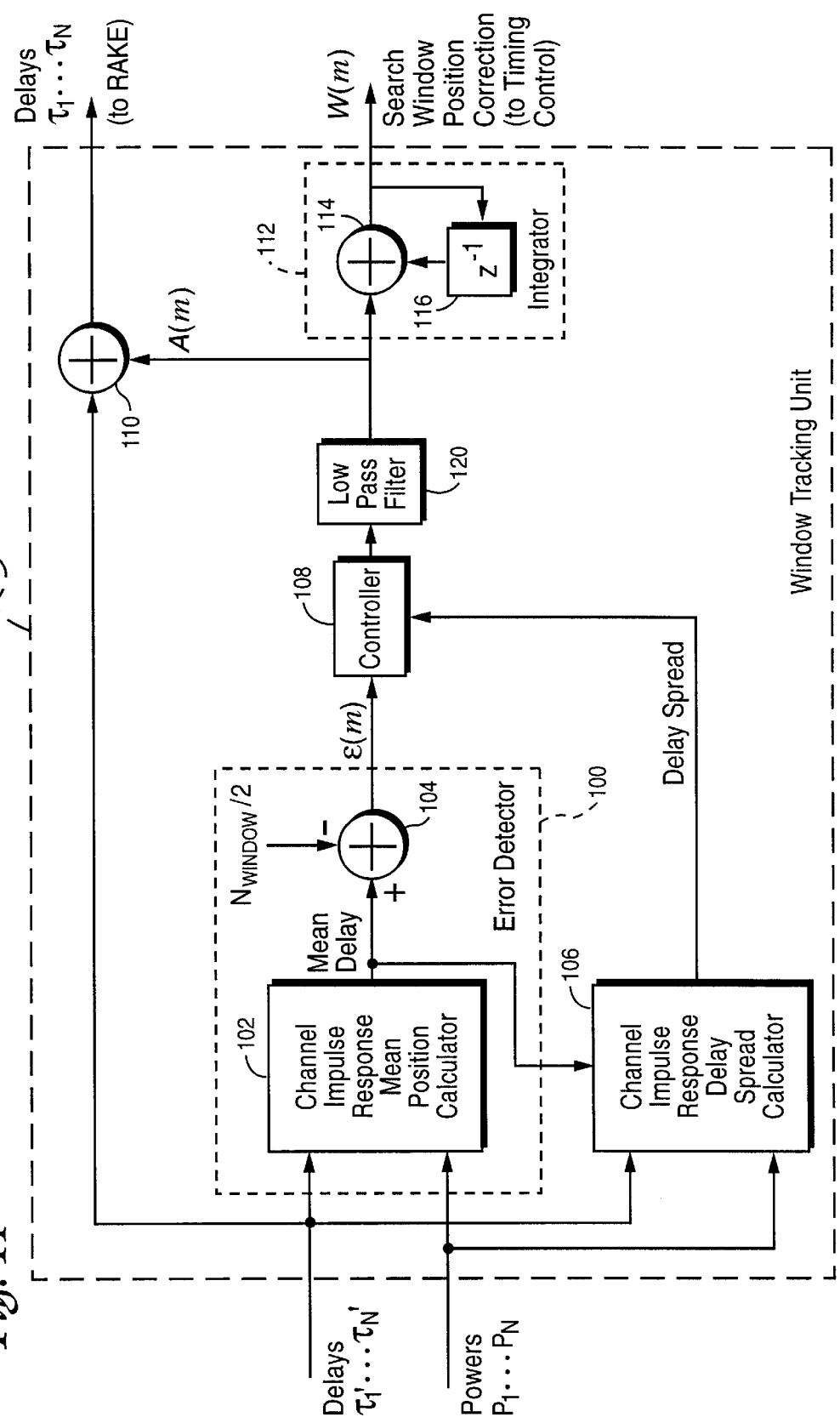
FIG. 11 is a function block diagram of a window tracking unit in accordance with another example embodiment of the present invention.

In a first example embodiment, the controller may simply be a linear low-pass filter and functions as a control loop filter. A preferred choice of the loop filter bandwidth compromises the output noise variance and the loop tracking speed. A second example embodiment of the present invention implements controller 108 using a non-linear, low-pass, error-filtering process referred to as "error verification" and will be described further below. A third example embodiment of the window tracking unit 70 used in conjunction with the error verification embodiment is shown in FIG. 11. A low-pass filter 120 filters the output of controller 108 before it is provided to summer 110 and integrator 112. The low-pass filter 120 smoothes the control signal output from the controller 108, reducing the remaining noise in the control signal.

Figure 12:
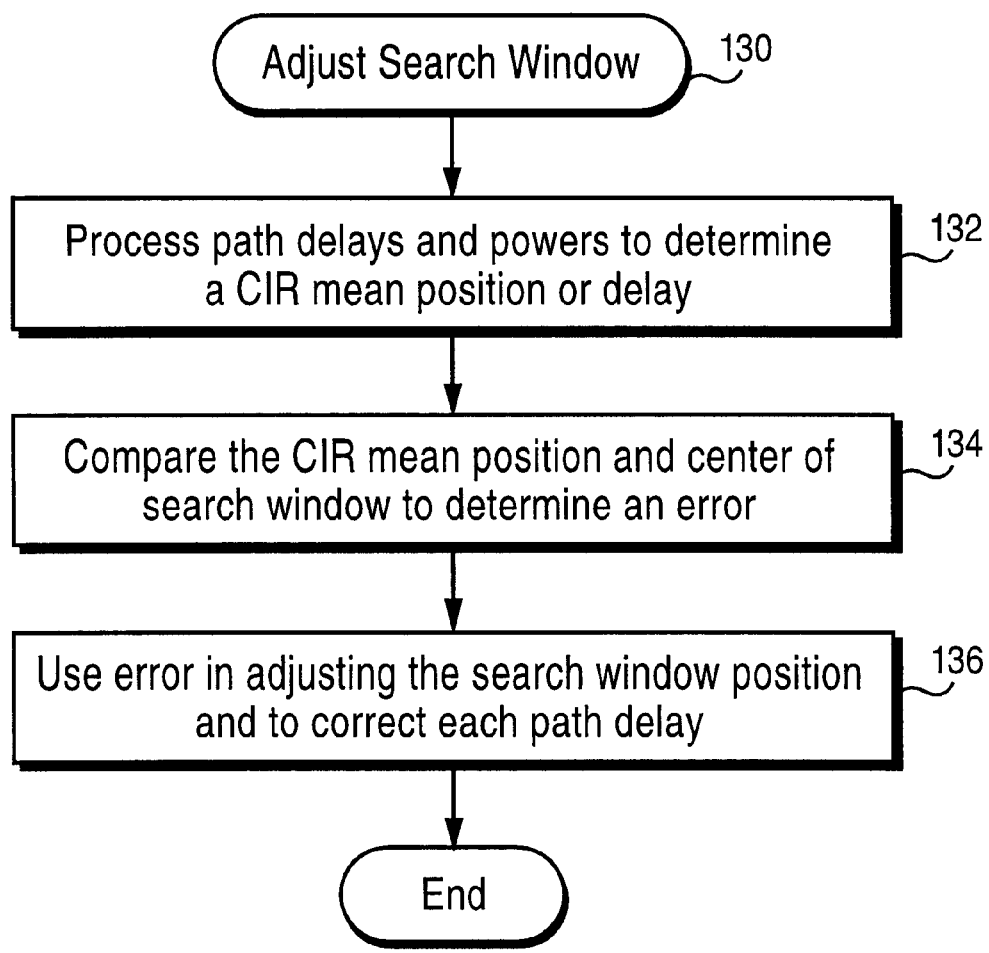
FIG. 12 is a flowchart illustrating search window delay tracking procedures in accordance with one example embodiment of the present invention.

The general operation for adjusting the search window is now described in the Adjust Search Window routine (block 130) shown in flowchart format in FIG. 12. Path delays and powers corresponding to those strongest paths selected for RAKE demodulation are processed to determine a channel impulse response (CIR) mean position or delay (block 132). In other words, the path delays and powers of the selected paths make up the channel impulse response corresponding to the received signal. The CIR mean position is compared to the center of a search window to determine an error (block 134). That error is used to adjust the search window position relative to the CIR mean position as well as to correct each path delay used by the RAKE demodulator (block 136).

Figure 13:
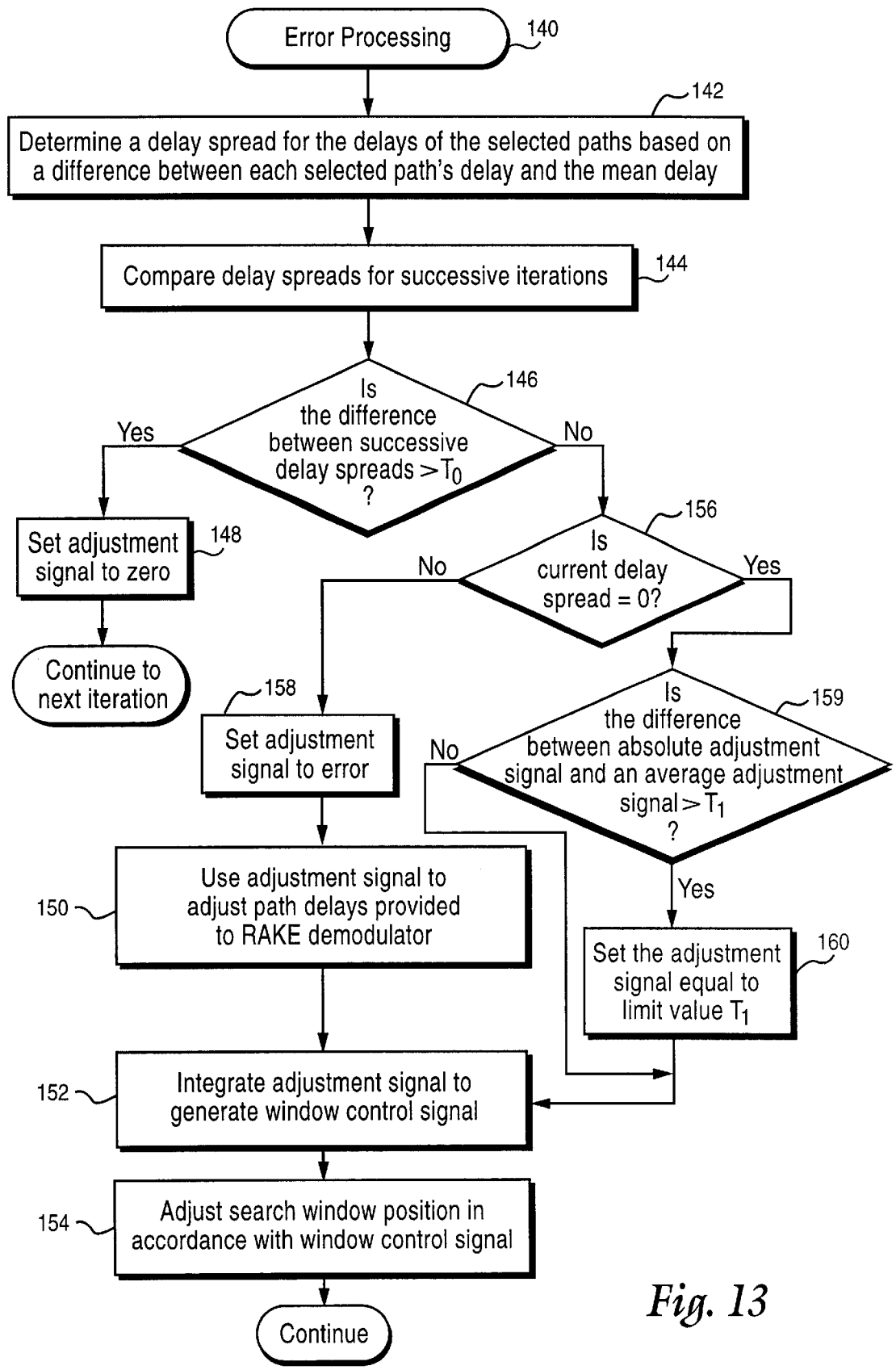
FIG. 13 is a flowchart illustrating further search window delay tracking procedures in accordance with an example embodiment of the present invention.

A specific but nonetheless example set of procedures for processing the error determined in block 134 is now described in conjunction with the Error Processing routine (block 140) illustrated in flowchart format in FIG. 13. A delay spread is determined for the delays of the selected paths based on a difference between each selected path's delay and the mean delay (block 142). The delay spreads are then compared for successive iterations (block 144). A decision is made in block 146 if the difference between successive delay spreads is greater than or less than a threshold To. If so, the adjustment signal is set to zero (block 148). If not, a decision is made in block 146 whether the current delay spread equals zero. If not, the adjustment signal is set to the error (block 158). The adjustment signal corresponding to the error is used to adjust path delays provided to the RAKE demodulator (block 150). If the current delay spread equals zero, the absolute adjustment signal value is compared with an average adjacent signal, and if the difference is larger than $T_1$ (block 159), the adjustment signal is set to a limit value $T_1$ (block 160). The adjustment signal is integrated (block 152) to generate a window control signal. The search window location is then adjusted in accordance with the window control signal (block 154).

Specific parameters and equations that may be used to in the window tracking unit 70 to perform various functions are now described. The mean delay is calculated using the following equation:

$$\text{mean\_delay} = \frac{\sum_{k=1}^{N} \tau_k' \cdot P_k}{\sum_{k=1}^{N} P_k}, \text{ if } \sum_{k=1}^{N} P_k > 0, \quad (2)$$

where $\tau_k' \in (0, 1, \ldots, N_{window-1})$ are path delays, N is the number of selected paths, and $P_k$ are the corresponding signal powers. Each path delay is expressed as an integer number of positions (sampling time intervals) from the search window start position. The total number of searched positions within the search window is equal to $N_{window}$.

The error signal $\epsilon(m)$ is obtained as the difference between the mean_delay and the middle position in the search window, i.e., $$\varepsilon(m) = \text{mean\_delay} - \frac{N_{window}}{2} \quad (3)$$

The controller 108 processes the error signal $\epsilon(m)$ in order to reduce the influence of noise, i.e., to prevent or reduce the movement of the search window due to an erroneous adjustment signal produced as a result of noise or interference.

The error verification embodiment is based on monitoring the difference between successive values of the delay spread.

For each new channel impulse response obtained from the search path selection unit, a delay spread value is calculated using the following equation:

$$\text{delay\_spread} = \sqrt{\frac{\sum_{k=1}^{N}(\tau_k' - \text{mean\_delay})^2 \cdot P_k}{\sum_{k=1}^{N} P_k}} \quad (4)$$

If the delay spread in the current iteration "m" is significantly different from the delay spread in the previous iteration, the new error sample calculated in the current iteration is considered unreliable. This situation may happen when false paths caused by noise (interference) are detected, or when one or more valid paths temporarily disappears under the influence of Rayleigh fading.

When the delay spread difference exceeds a certain threshold, the adjustment sample A(m) is forced to zero. Consequently, the PN generator phase is not adjusted, and therefore, the search window position stays the same. Accordingly, the algorithm for the adjustment calculation can be described by the following expression $$A(m) = \begin{cases} \varepsilon(m), & |C_0(m)| \le T_0, \\ 0, & |C_0(m)| > T_0, \end{cases} \quad (5)$$

for delay_spread(m) ≠ 0, for delay_spread(m)≠0, (5)

where condition $C_0$ (m) is given by $$C_0(m) = \text{delay\_spread}(m) - \text{delay\_spread}(m-1), \quad (6)$$

and $T_0$ is a delay spread difference threshold.

Due to the pulse shaping filtering and operation of path selection unit, any particular path position can fluctuate within a few samples under the influence of noise, so consequently the delay spread can fluctuate even if a new path does not appear. Accordingly, the threshold $T_0$ is not set to the ideal value equal to zero, but instead is set to some non-zero value, e.g., $T_0=4$. In practical situations when a mobile station is moving and where the delay spread may change dramatically from time to time, the control signal A(m) will be zero only in a single iteration when the large change of delay spread is first detected. Afterwards the delay spread difference decreases to smaller values that permit adjustment of the search window.

This non-linear filtration of the error signal is not applied in the case where the current delay spread is zero while the difference from the previous delay spread value is below the threshold. This situation occurs when the power delay profile estimated in the searcher contains only impulsive noise so the path selection unit finds only a single false path with a random delay and zero delay spread. If this happens in two successive iterations, the difference between delay spreads will be zero, so the above error verification condition in equation (5) will be satisfied and an erroneous adjustment signal value will be passed.

Therefore, when the current delay spread is zero, the adjustment signal is produced as follows:

$$A(m) = T_1 \cdot sgn[\varepsilon(m)], \text{ if delay\_spread}(m) = 0 |C_0(m)| \le T_0 |C_1(m)| \le T_1(7)$$

and $$A(m) = \varepsilon(m), \text{ if delay\_spread}(m) = 0, |C_0(m)| \le T_0 |C_1(m)| \le T_i, \\ (|C_n(m)| \le T_1) \quad (8)$$

where $$C_1(m) = |\varepsilon(m)| - |\overline{A(x)}|, \quad (9)$$

and $T_1=4$ is the adjustment magnitude threshold. $|\overline{A(X)}|$ is an average of the adjustment magnitudes, which is calculated periodically within some chosen time interval, e.g., $$|\overline{A(x)}| = \frac{1}{N_{av}} \sum_{l=(x-1) \cdot N_{av}}^{x \cdot N_{av}-1} |A(l)| \quad (10)$$

where $x=\text{integer}(m/N_{av})$. Regarding the above analysis, the same performance can be expected if the delay_spread is replaced by its squared value (the same holds for the threshold $T_0$) which from is more convenient for implementation in a digital signal processor.

Thereafter, the adjustment signal A(m) is integrated to produce the search window position control signal W(m) given by $$W(m) = W(m-1) + A(m) \quad (11)$$

which determines the relative phase of a PN sequence generator 58 with respect to the input signal via timing control unit 56, i.e., a positive or negative time shift of the generated PN sequence. If the PN generator 58 is implemented using a shift-register with a feedback loop and a controllable clock frequency, the integrator 112 is not used and the adjustment signal A(m) is fed back to the PN generator 58 which itself functions as an integrator. In any case, a positive value of the control signal causes an additional delay of the generated PN sequence, and a negative value produces an advancement of the generated PN sequence. For practical implementation, it may be desirable to quantize the tracking control signal, so that it corresponds to an integer number of PN chips. Because there is a fixed relation between the data symbol and PN sequence timing, the delay or advancement of the PN sequence phase influences frame, slot, and data synchronization in the same way. Consequently, the proper functioning of the pilot demultiplexers 76 dependent on time slot synchronization is thereby ensured.

Beside keeping the channel impulse response centered in the search window, the window tracking unit 70 adapts the selected path delays $\tau_1', \ldots, \tau_N'$ according to the adjustments of the search window. Namely, there is a delay of one frame period before the searcher 60 determines the new path delays corresponding to the changed window position. During that time, the phase of the de-spreading PN sequence generated by the PN generator 58 will have already been adjusted, so for correct path combining in the RAKE demodulator 54, it is necessary to temporarily adjust the already found path delays, until the newly-determined, correct path delays arrive from the path selection unit.

While the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. In a radio receiver, a method comprising the steps of:
   estimating a channel impulse response for a received signal containing plural paths, each path having a corresponding path delay;
   calculating a mean delay for the estimated channel impulse response (CIR) using plural path delays;
   determining a delay error between the mean CIR delay and a desired delay position; and
   making an adjustment to reduce the delay error.

2. The method in claim 1, wherein a CIR search window defines a delay profile that contains the plural paths of the received signal, the desired delay position corresponds to a center of the CIR search window.

3. The method in claim 2, further comprising:
   selecting optimal ones of the plural paths based on the estimated channel impulse response;
   demodulating each of the selected paths based on its corresponding delay; and
   combining the demodulated paths to generate a demodulated received signal.

4. The method in claim 2, the calculating step further comprising processing path delays and powers corresponding to the selected paths to determine the mean delay in accordance with the following:

$$\text{mean\_delay} = \frac{\sum_{k=1}^{N} \tau'_k \cdot P_k}{\sum_{k=1}^{N} P_k}, \text{ if } \sum_{k=1}^{N} P_k > 0,$$

where N is the number of selected paths, $\tau_k' \in (0, 1, \ldots, N_{window-1})$ are path delays, and $P_k$ are the corresponding path powers.

5. The method in claim 1, further comprising:
   processing the delay error.

6. The method in claim 5, wherein the processing is performed using a linear low pass filter.

7. The method in claim 5, wherein the processing is performed using a nonlinear filtering process.

8. The method in claim 7, wherein the nonlinear filtering process includes:
   calculating a delay spread from the calculated mean CIR delay in accordance with the following:

$$\text{delay\_spread} = \sqrt{\frac{\sum_{k=1}^{N} (\tau'_k - \text{mean\_delay})^2 \cdot P_k}{\sum_{k=1}^{N} P_k}}$$

where
   N is the number of selected paths, $\tau_k' \in (0, 1, \ldots, N_{widow-1})$ are path delays, and $P_k$ are the corresponding path powers,
   determining a difference between successive delay spreads;
   setting an adjustment signal to the delay error if the difference is less than or equal to a threshold; and
   setting the adjustment signal to zero if the difference is greater than the threshold.

9. The method in claim 8, wherein when a current delay spread is zero and the difference is less than or equal to the threshold, the method further comprising:
   setting the adjustment signal to an adjustment magnitude threshold whose sign depends on the polarity of the delay error under a first condition, and
   setting the adjustment signal to the delay error under a second condition.

10. The method in claim 8, further comprising:
    integrating the adjustment signal, and
    applying the integrated adjustment signal to change the position of the search window.

11. The method in claim 10, farther comprising:
    low pass filtering the adjustment signal before the integrating step.

12. The method in claim 8, further comprising: adjusting delays for selected paths using the adjustment signal.

13. In a radio receiver receiving from each of plural sectors a signal containing plural paths, each path having a corresponding path delay, a method comprising the steps of:
    for each sector, estimating a channel impulse response (CIR) for the received signal using a channel estimator;
    defining an associated search window for each channel estimator, where each search window defines a delay profile containing plural paths of the received signal;
    selecting optimal ones of the plural paths from the delay profiles;
    calculating a mean delay from the selected paths;
    determining a delay error between the calculated mean CIR delay and a desired delay; and
    making an adjustment to reduce the delay error.

14. The method in claim 13, wherein the desired delay position corresponds to a center of the search window.

15. The method in claim 13, wherein each of the search windows associated with the delay profiles is the same length and the search windows are synchronized, wherein the making an adjustment step further comprises:
    generating an adjustment signal used to make a search window position correction in order to reduce the delay error.

16. The method in claim 13, further comprising:
    demodulating each of the selected paths using its corresponding delay; and
    combining the demodulated paths to generate a demodulated received signal.

17. The method in claim 14, the calculating step further comprising for processing path delays and powers corresponding to the paths for each delay profile to determine the mean delay for the delay profile in accordance with the following:

$$\text{mean\_delay} = \frac{\sum_{k=1}^{N} \tau'_k \cdot P_k}{\sum_{k=1}^{N} P_k}, \text{ if } \sum_{k=1}^{N} P_k > 0,$$

where N is the number of selected paths, $\tau_k' \in (0, 1, \ldots, N_{window-1})$ are path delays, and $P_k$ are the corresponding path powers.

18. The method in claim 13, further comprising: processing the delay error.

19. The method in claim 18, wherein the processing is performed using a linear low pass filter.

20. The method in claim 18, wherein the processing is performed using a nonlinear filtering process.

21. The method in claim 20, wherein the nonlinear filtering process includes:

calculating a delay spread from the calculated mean delay in accordance with the following:

$$\text{delay\_spread} = \sqrt{\frac{\sum_{k=1}^{N} (\tau_k' - \text{mean\_delay})^2 \cdot P_k}{\sum_{k=1}^{N} P_k}}$$

where

N is the number of selected paths, $\tau_k' \in (0, 1, \ldots, N_{window}-1)$ are path delays, and $P_k$ are the corresponding path powers, determining a difference between successive delay spreads;

setting an adjustment signal to the delay error if the difference is less than or equal to a threshold; and setting the adjustment signal to zero if the difference is greater than the threshold.

22. The method in claim 21, wherein when a current delay spread is zero and the difference is less than or equal to the threshold, the method further comprising:

setting the adjustment signal to an adjustment magnitude threshold whose sign depends on the polarity of the error under a first condition, and setting the adjustment signal to the error under a second condition.

23. The method in claim 21, further comprising:

integrating the adjustment signal, and applying the integrated adjustment signal to change the position of the search window.

24. The method in claim 23, further comprising:

low pass filtering the adjustment signal before the integrating step.

25. The method in claim 21, further comprising:

adjusting delays for selected paths using the adjustment signal.

26. A search window tracking unit for use in a radio receiver receiving a signal having plural paths, comprising:

a processor for receiving delay and magnitude values associated with selected paths of the received signal and determining a mean position of a channel impulse response (CIR) corresponding to the selected paths;

an error detector for determining an error between the mean CIR position and a position of a search window used to locate the channel impulse response; and a controller for making an adjustment to reduce the error.

27. The search window tracking unit according to claim 26, wherein the controller adjusts a position of the search window.

28. The search window tracking unit according to claim 22, wherein the controller is a linear low pass filter.

29. The search window tracking unit according to claim 26, wherein the processor is configured to determine, a center position of the search window and the difference is between the mean CIR position and the center position.

30. The search window tracking unit according to claim 29, wherein the processor is further configured to determine a CIR delay spread using the mean CIR position and the controller is configured to generate an adjustment signal for reducing the error using the CIR delay spread.

31. The search window tracking unit according to claim 30, wherein the controller is configured to calculate the CIR delay spread from the mean CIR position for successive iterations, determine a difference between the successive delay spreads, and set an adjustment signal to the error signal if the difference is less than or equal to a threshold or set the adjustment signal to zero if the difference is greater than the threshold.

32. The search window tracking unit according to claim 31, further comprising:

an integrator for integrating the adjustment signal, wherein the integrated adjustment signal is applied to change the position of the search window.

33. The search window tracking unit according to claim 32, further comprising:

a low pass filter for filtering the adjustment signal before the integrating step.

34. A radio base station comprising:

plural sectors, each of the plural sectors having one or more antennas receiving a signal from a mobile station containing multiple paths, each path having a corresponding delay;

a multipath search processor including:

a channel estimator for each of the plural sectors, each channel estimator estimating a channel impulse response (CIR) for the received signal and generating a delay profile within a CIR search window, and a path selector for selecting paths from the delay profiles generated by each channel estimator and generating a delay and a magnitude for each selected path;

a window tracking unit for maintaining alignment of a center of the CIR for each channel estimator and a center of the channel estimator's corresponding search window; and a demodulator for demodulating the selected paths and combining the demodulated paths into a combined received signal.

35. The radio base station in claim 34, wherein the window tracking unit is configured to adjust the search windows to maintain the alignment and adapts the delays for the selected paths according to the adjustment to the search windows.

36. The radio base station in claim 34, wherein each sector includes two diversity antennas and the base station further comprises a sector selector for selecting one of the diversity antennas.

37. The radio base station in claim 34, wherein each search window is defined by N delay intervals corresponding to a number of sampling intervals.

38. The radio base station in claim 37, wherein the window tracking unit is configured to calculate a mean delay from the selected paths, determine an error between the mean delay and N/2 delay intervals, and adjust the position of each search window in order to reduce the error.

39. The radio base station in claim 38, wherein the window tracking unit is configured to generate an adjustment signal used to shift each of the search windows to reduce the error.

40. The radio base station in claim 39, wherein the window tracking unit includes a controller that is configured to calculate a delay spread from the mean delay for successive iterations, determine a difference between the successive delay spreads, and set an adjustment signal to the error signal if the difference is less than or equal to a threshold or sets the adjustment signal to zero if the difference is greater than the threshold.

41. The radio base station in claim 40, wherein the window tracking unit includes:

an integrator for integrating the adjustment signal, wherein the integrated adjustment signal is applied to change the position of the search window.

* * * * *